P. H. JOHNSTON.
SPECTACLE AND EYEGLASS MOUNTING.
APPLICATION FILED MAR. 30, 1916.

1,248,869.  Patented Dec. 4, 1917.

Witness:
Wm Harold Eiselman

Inventor:
Paul H. Johnston
Benjamin, Goodhouse & Lundy
atty's

UNITED STATES PATENT OFFICE.

PAUL H. JOHNSTON, OF DAVENPORT, IOWA.

SPECTACLE AND EYEGLASS MOUNTING.

1,248,869.  Specification of Letters Patent.  Patented Dec. 4, 1917.

Application filed March 30, 1916.  Serial No. 87,709.

*To all whom it may concern:*

Be it known that I, PAUL H. JOHNSTON, a citizen of the United States, and a resident of Davenport, in the county of Scott and State of Iowa, have invented certain new and useful Improvements in Spectacle and Eyeglass Mountings, of which the following is a full, clear, and exact description.

My invention relates to mountings for the lens of spectacles, eyeglasses, eye-protectors, and the like, and more particularly to means whereby a quick, dependable and easily detached connection may be made between the lens and the lens-box of the mount.

One of the objects of my present invention is the provision in a mount of means whereby lenses of divers thicknesses or curvatures may be accommodated between the clamping ears of the lens-box. Another object of my invention is the provision of means on the lens or integral therewith whereby the member adapted to engage and lock the lens between the ears will firmly engage the same. Still another object of my invention is to provide a lens with a depression or recess that may be made in a simple manner and at the same time avoid the necessity for boring entirely through the lens.

These and further objects I prefer to accomplish by the means and in the manner hereinafter fully described and as more particularly pointed out in the claims, reference being had to the accompanying drawings forming a part of this specification, wherein, Figure 1 is a side elevation of the lens-securing portion of a lens-mount constructed in accordance with my invention.

Figure 1:
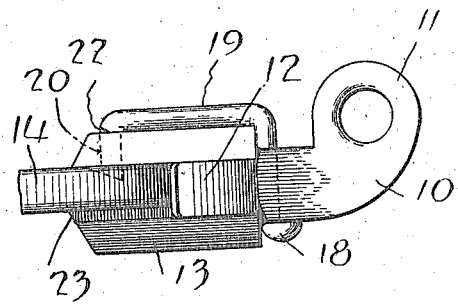
Figure 2:
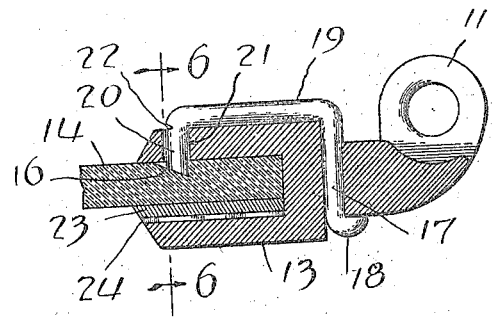
Fig. 2 is a longitudinal vertical section thereof taken on line 2—2, Fig. 6.
Figure 3:
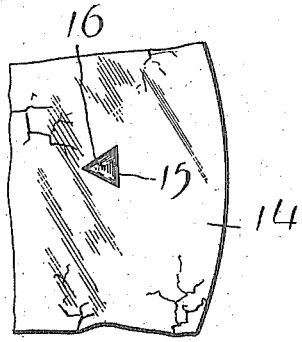
Fig. 3 is a fragmentary view of the surface of a lens provided with a depression or recess made in accordance with my invention.
Figure 4:
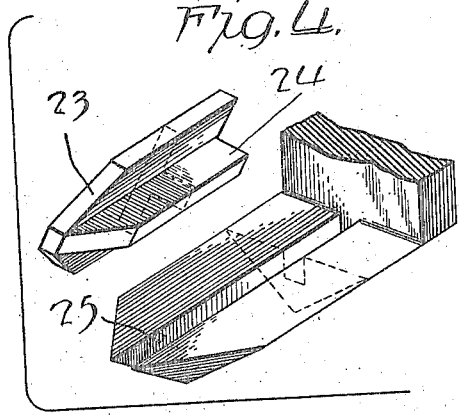
Fig. 4 is a fragmentary perspective view of a portion of a lens-box showing the parts about to be assembled.

Referring to the drawings, it will be observed I have illustrated, for the sake of simplicity, the portion of a lens mount adapted to connect with a temple, but it is obvious that this same lens connecting structure may be used at all parts of a mounting which make connection with the lens. My improved mount preferably comprises the usual stud 10 that is provided with knuckles or lugs 11 at one end and at its opposite end is provided with oppositely extending straps 12, 12, that are adapted to engage a portion of the perimeter of the lens. Suitable parallel lens-ears 13, 13, project from the stud at a point intersecting the straps 12 and preferably alining with said stud 10, so that they are adapted to engage opposite surfaces of the lens 14 adapted to be fitted and secured between the same.

Figure 6:
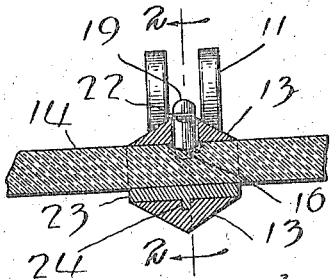
Fig. 6 is a transverse vertical section taken on line 6—6, Fig. 2.

In order to secure the lens 14 in the lens-box just described, I prefer to place a shallow indentation, depression or recess in one of the surfaces of the lens, said recess being formed by a grinding tool of substantially conical outline so that the recess is formed with the base 15 of the cone disposed at substantially right-angles to the surface of the lens in which the recess is made and adjacent the periphery of the lens, while the conical surface 16 of the recess inclines upwardly from the bottom of the base 15 to the surface of the lens, as shown in Fig. 6 of the drawings. The recess is so positioned with relation to the edge of the lens that it is adapted to receive and seat the adjacent end of a suitable flexible spring latch carried by the lens-box.

The latch just alluded to comprises a strip of spring metal bent to the shape shown in the drawings and has one of its arms 17 secured to the lens-box in any suitable manner, preferably by inserting it through a hole formed in the shank of the stud 10 and swaging its extended end to provide a head 18. The remaining portion 19 of the latch extends along the outer surface of the adjacent ear 13 and has its outer end 20 bent at right-angles thereto and inserted through a hole 21 formed in the outer ends of the ear 13. The inner end of member 20 is given a conical surface preferably as shown so as to engage and fit the recess formed in the facing surface of the lens, and at the bend of the metal a suitable notch or kerf 22 is made for the purpose of inserting a tool to release said member 20 from the lens.

Figure 5:
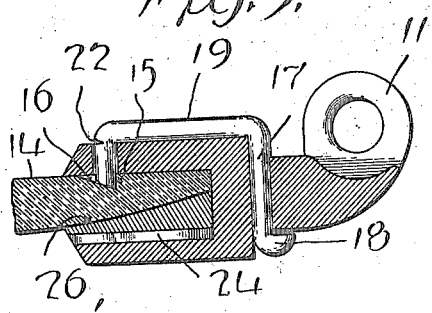
Fig. 5 is a sectional view similar to Fig. 2 showing my improved lens-box or mount secured to a lens having a convex surface.

The manner of assembly is comparatively simple and is preferably accomplished by inserting the lens between the ears and permitting the engaging member 20 of the spring latch to snap into position in the recess in the surface of the lens. However, it will frequently be found that the lenses vary in thickness and surface curvature and in order to take care of this contingency and permit the mounting to fit tightly and firmly to the lens being mounted I have provided a suitable shim or block 23 that is adapted to be disposed between the ear opposite the latch and the adjacent lens surface. This shim preferably comprises a plate corresponding upon one surface with the contour of the lens ear of the mounting and is provided with a laterally projecting tenon or rib 24 that is adapted to fit into a corresponding groove or recess 25 made in the adjacent surface of the lens ear. The opposite surface of the shim 23 is either plain or is curved as shown in Fig. 5 to conform with the surface of the lens which it is desired to mount and thus permit a lens having a curved surface 26 to be fitted in the box in which latter event the shim will be substantially wedge-shaped in longitudinal section as illustrated.

Thus it will be seen that the optician need only provide himself with a comparatively few sizes of lens-boxes and can keep in stock a large number of shims of divers thicknesses and surface contour which are comparatively inexpensive, thus avoiding the necessity of manufacturing and carrying in stock a large assortment of expensive lens-boxes or mounts as is now usually necessary.

While I have herein shown and described certain specific means for carrying out my invention it of course will be obvious to others skilled in the art to which it pertains that divers modifications and refinements thereof are possible without materially departing from the spirit of my invention. For example, the shim may be provided with an indentation or groove that is engaged by a protruding member or rib on the engaging ear of the lens-box, or the engaging parts may be plain. I therefore desire it understood that all such obvious changes are contemplated as coming within the scope of my invention as expressed in the appended claims.

What I claim is:—

1. In a lens mount in combination with a lens-box provided with ears adapted to be disposed upon opposite surfaces of a lens, of a block co-acting with the inner surface of one of said ears and adapted to modify the size and shape of the opening between said ears available for the insertion of a lens, a spring latch extending into the space between said ears, and a lens having a conical recess in one of its surfaces adapted to receive said latch whereby the lens is pressed against said block and its coöperating ear and is secured against withdrawal from between said ears.

2. A spectacle or eyeglass mounting comprising a lens, a box provided with a member extended upon one face of said lens, a separate integral spring member carried by said box and adapted to engage the face of said lens directly opposite said first-mentioned member, and a block interposed between said lens and said first-mentioned member against which said lens is adapted to be pressed by said spring member.

Signed at Chicago, county of Cook and State of Illinois, this 27th day of March 1916.

PAUL H. JOHNSTON.

Witnesses:
BENJ. T. ROODHOUSE,
WM. HAROLD EICHELMAN.

Copies of this patent may be obtained for five cents each, by addressing the "Commissioner of Patents, Washington, D. C."